(No Model.) 2 Sheets—Sheet 1.
H. L. GEE.
TRUCK FOR MOTOR CARS, &c.
No. 605,952. Patented June 21, 1898.
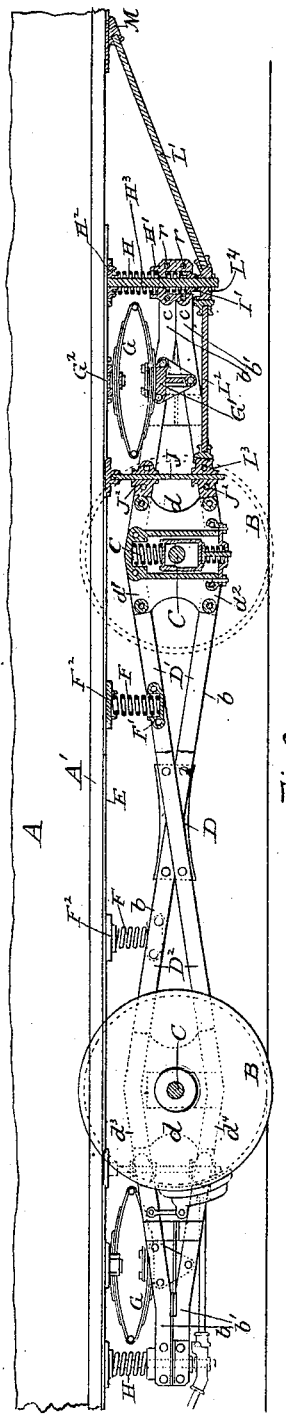
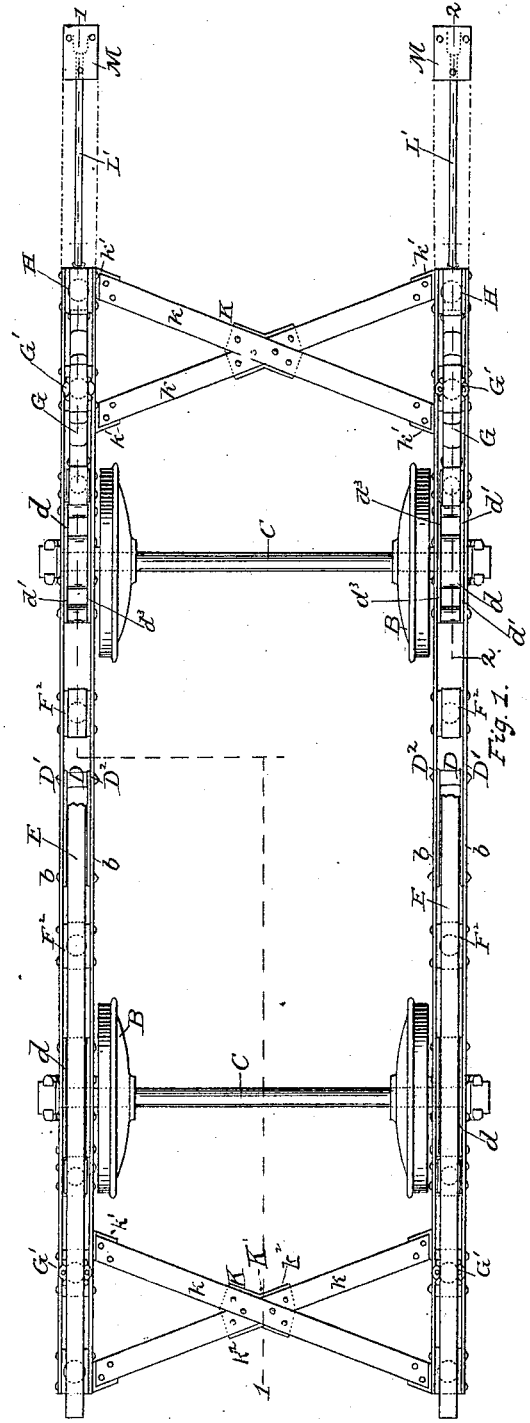
Fig. 2.
Fig. 1.
Witnesses.
Horace L. Gee,
Inventor.
by Alex. Selkirk.
Attorney.
THE NORRIS PETERS CO., PHOTO-LITHO., WASHINGTON, D. C.

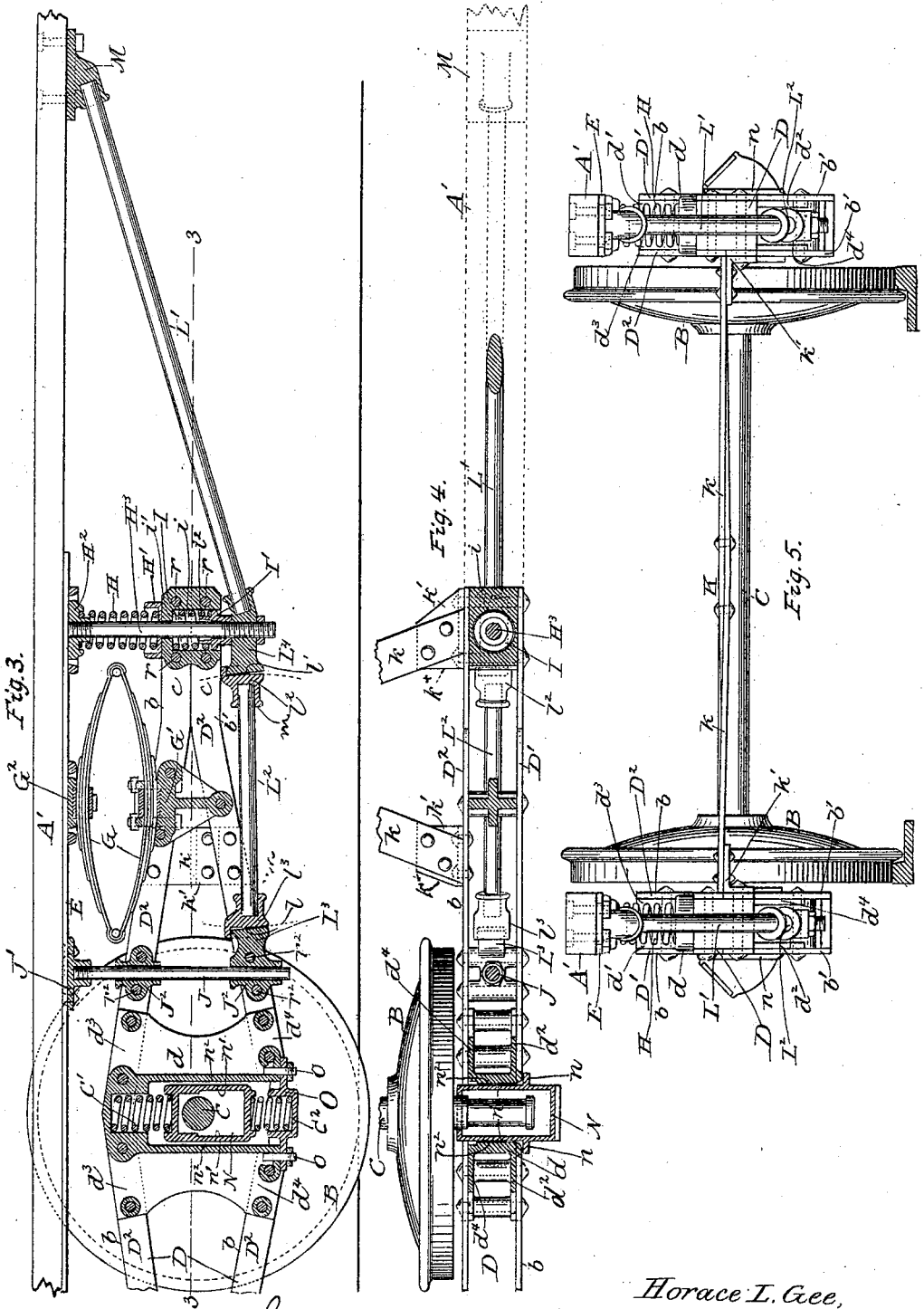

UNITED STATES PATENT OFFICE.

HORACE L. GEE, OF KINGSTON, NEW YORK, ASSIGNOR TO THE DIAMOND TRUCK AND CAR GEAR COMPANY, OF SAME PLACE.

TRUCK FOR MOTOR-CARS, &c.

SPECIFICATION forming part of Letters Patent No. 605,952, dated June 21, 1898.

Application filed January 10, 1896. Serial No. 574,926. (No model.)

*To all whom it may concern:*

Be it known that I, HORACE L. GEE, a citizen of the United States, residing at Kingston, in the county of Ulster and State of New York, have invented certain new and useful Improvements in Trucks for Electric-Motor and Cable Cars, of which the following is a specification.

My invention relates to improvements in trucks for electric-motor cars, cable-cars, or other cars not drawn by animals or any hauling power; and it consists in the combinations of devices and elements hereinafter described, and specifically set forth in the claims.

The objects of my invention are to provide, in a truck designed to be used for carrying a car-body of great length, combinations of devices which are calculated to reduce the length of vertical oscillations of the ends of the car-body carried by the truck to a minimum; to prevent both an endwise and sidewise racking of the elastic supporting devices of the bolster-plates securing the car-body to the truck; to rigidly secure the two opposite side frames of the truck against shifting endwise in relation to each other and thereby relieve the framework of the car-body from all racking strains; to elastically support the brake-shoes, so that their concave braking-surfaces may be held from being canted in relation to the periphery of the wheels they operate with; to support the outer or platform end portions of the car-body from being deflected downwardly by the weight of the load that may be imposed on the same when in service, and to reduce the binding of the housings of the axle-journals in the pedestals and permit the adjoining side surfaces of the housings and jaws of the pedestals from materially abrading each other in the vertical or endwise movements of the said housings between the jaws of the pedestals. I attain these objects by the means illustrated in the accompanying drawings, forming a part of this specification, in which—

Figure 1 is a plan view of a car-truck embodying the improvements in my invention and illustrating the same and having parts of the bolster-plates removed for exposing parts below. Fig. 2 is an elevation taken at lines 1 1 in Fig. 2 and showing the body of a car seated on the bolster-plate. Fig. 3 is a sectional elevation, on an enlarged scale, of an end section or portion of a truck embodying my improvements and illustrating operations of the same. Fig. 4 is a plan view, with the side frame shown in section, taken at line 3 3 in Fig. 3; and Fig. 5 is an end view of the truck.

The same letters of reference indicate similar parts throughout the several views.

In the drawings, A is the car-body, (a section thereof.) A' is the lower sill of the same. B B are the truck-wheels.

C C are the axles, and D D are the two side frames, of the truck, which side frames are mounted on said axles with the load-bearing springs $C'$ $C'$ interposed between the latter and said frames. These side frames D D are each dual in character and comprise each two similar duplicate frames $D'$ $D^2$, Fig. 1, formed of bar members $b$ $b$ and $b'$ $b'$, preferably of flat bar-steel, and pedestals $d$ $d$, which are rigidly secured to said bar members, as shown in Figs. 1 and 2, and preferably by rivets driven and headed red-hot. The bar members $b$ $b$ of each of said duplicate frames $D'$ $D^2$, comprising the dual side frames D, are shown in Fig. 2 to extend each from an opposite end of the frame to and pass the respective upper flanges of pedestal $d$ and then cross each other midway between the two pedestals $d$ $d$, and then run to a lower flange of the other pedestal. The bar members $b$ $b'$ of the outer side frame $D'$ of each dual frame D are secured by means of rivets to the outer side flanges $d'$ $d^2$ of the pedestals $d$ $d$, while the bar members $b$ $b'$ of the inner side frames $D^2$ are secured to the inner side flanges $d^3$ $d^4$ of the same pedestals and secured to the same by the rivets which secure the bar members $b$ $b'$ of the outer side frame D to the respective flanges of said pedestals. The lower end members $b'$ $b'$ of each of the similar frames $D'$ $D^2$ have their respective outer ends rigidly secured with the outer ends of the bar members $b$ $b$ with which they respectively are contiguous, while their respective opposite ends are rigidly secured to the lower flanges $d^2$ $d^4$ of said pedestals by same rivets, so as to brace from the lower ends of said pedestals the outer ends of the bar members $b\ b$ of frames $D'\ D^2$ of each dual side frame D. Although these dual side frames D D may be of any preferred form of construction and comprise any suitable arrangement of bar-form members, as $b\ b'$, secured to the pedestals $d\ d$, yet I prefer to employ side frames of the form known as the "dual diamond frame." (Shown in Fig. 2 and in Letters Patent No. 503,093 to George W. Lacy and dated August 8, 1893, and No. 563,188, dated June 30, 1896.)

E E are longitudinal bolster-plates on which the sills of the car-body A are seated and secured. These bolster-plates are elastically supported by means of suitable load-bearing springs, which are interposed between the frame D D of the truck and said bolsters.

As each dual side frame D in this truck, with its adjunctive devices and parts, are substantially duplicates of the other, a description of one of said side frames and its adjuncts will suffice for the other.

F F are spiral springs seated on seating-blocks $F'\ F'$, arranged in the middle portion of the dual frame D at points midway between the middle of length of the truck between the pedestals $d\ d$ and the said pedestals themselves, as shown in Figs. 1 and 2. These seating-blocks $F'$ are shown in Fig. 1 to be between the bar members $b\ b$ of the duplicate frames $D'\ D^2$, comprising the dual frame D, and are secured to said bar members $b\ b$ by rivets driven and riveted while red-hot.

$F^2\ F^2$ are the upper end seating-blocks, rigidly secured to the lower side of the bolster-plates E by bolts or rivets, and said springs F F are interposed between these two sets of blocks $F'\ F^2$, as shown in Fig. 2.

G G are elliptic springs, one between each outer end portion of the side frame D and the bolster E, and are arranged lengthwise in relation to said bolster and are each seated on a spring-block $G'$, secured between the bar members $b\ b'$ of the parallel side frames $D'\ D^2$ of the dual frame D and secured thereto by rivets, hot-driven and riveted. These spring-blocks thus arranged and secured not only serve as seats for springs G, but also as tie-pieces between bar members $b\ b'$ individually and the duplicate frames $D'\ D^2$, between which said seating-blocks are secured.

$G^2\ G^2$ are upper spring-blocks which are rigidly secured to bolster-plate E by bolts or rivets or clips, and also to the upper half of each said spring.

H H are spiral springs between the outer ends of the frame D and bolster-plate E. These springs H are each seated on suitable seating-blocks $H'$, arranged between the bar members $b\ b'$ of the duplicate frames $D'\ D^2$ and securely fastened in place therewith by means of rivets $r$, hot-driven and riveted. These blocks $H'$ form a rigid tie-piece between the members of said frames $D'\ D^2$ and with the rivets rigidly hold the outer ends of the respective bar members $b\ b'$ from moving.

The outer end portions $c\ c$ of the bar members $b\ b'$ of the duplicate frames $D'\ D^2$ are shown to be parallel and so formed that the lower edges of portions $c$ of the bar members $b$ will have bearing on the upper edges of portions $c$ of the bar members $b'$. With these end portions $c\ c$ of said bar members $b\ b'$ extended in horizontal and parallel lines and contiguous, so that their adjoining edges may have bearing on each other, the spring-blocks $G'$, by means of their fastening-rivets, tie the bar members $b$ and $b'$ of each frame $D'\ D^2$ together, and the blocks $H'$, extended from the upper edges of bar members $b$ to the lower edges of bar members $b'$ by the rivets securing said blocks with said bar members, also tie the end portions $c\ c$ of the several bar members securely together against shifting in any direction and operate to distribute the load carried by the respective springs G and H evenly on said bar members. Seating-pieces $H^2$, secured by means of bolts (clips or rivets) to the bolster-plate E, have bearing on the upper ends of said spiral springs H.

By means of the above-described spiral springs F F H H, and elliptic springs G G the load on the bolster-plate E is elastically supported from the dual side frame D. When the truck is in service with the motor (not shown) driving the truck, there is a tendency in this service to rack the several springs F, H, and G alternately forwardly and rearwardly when running on grades and under sudden stoppage and startings, while when running on curves there is also a tendency, from the horizontal swing of the car-body, to rack the same springs sidewise in relation to the truck. To prevent such racking of said springs in any direction, I employ vertical guiding-posts $H^3$, one at each end of each side frame D and the inner guiding-posts J, one in place near pedestal $d$ in each end portion of said side frames. The upper ends of these posts $H^3$ and J are each rigidly secured to the respective bolster-plates above by means of suitable pieces holding respectively with the upper end portions of said posts.

The guiding-posts $H^3$ have for their upper end holding-pieces the seating-pieces $H^2$ of springs H and have for their guiding-sleeves the lower seating-pieces $H'$ of the same springs, which seating-pieces are centrally perforated for receiving the movable bodies of said posts H. The seating-pieces $H'$ have in their lower sides spring-receiving chambers $i$, which receive each a reacting spring I, which is held compressed between the vertically-moving seating-piece $I'$ and seat $i'$ at the end of said chamber $i$ by a nut or its known substitute. These vertically-moving seating-pieces $I'$ are each of diameter corresponding with that of the chamber $i$, receiving the reacting spring I, and is wholly contained within the same with its outer sides bearing against the inner sides of the chamber, and thereby operate as a reinforcing element to the lower-half portion of the guiding-post on which said seating-piece I' nicely fits and prevents said lower-half portion becoming bent or deflected by strain thereon from any direction.

Each guide-post J is secured by its upper end to the bolster-plate above by means of head-piece J' and suitable rivets or bolts, while the body of the post is guided in its vertical movements by the pair of sleeves $J^2 J^2$, which are rigidly secured to the side frame on different planes, as shown in Figs. 2 and 5. The upper sleeve freely receives the portion of the guide-post J which is a little below the head-piece J', and is secured between the parallel bar members $b\ b$ of the duplicate frames $D'\ D^2$ by means of rivets $r^2$, (shown in Fig. 5,) so as to operate also as a tie-piece between said parallel bar members. The lower guiding-sleeve of the pair freely receives the lower end portion of the same guide-post, and is secured between the parallel bar members $b'\ b'$ of the same frames $D'\ D^2$ by means of rivets $r^2$, and it operates also as a tie-piece between those parallel bar members $b'\ b'$. The bores of these sleeves $J^2 J^2$ are shown to be of lengths equal to more than four diameters of the post, for preventing the post and sleeves cutting each other, yet this length of bearing of the sleeves on the post may each be reduced to a length of three or two diameters of the post and be attended with like advantageous results. These guide-posts J and their sleeves $J^2 J^2$, rigidly secured, as described, between the duplicate frames $D'\ D^2$, resist the tendency of the car-body to move either forward or rearward or swing laterally in relation to the truck-frame when running on grades, suddenly starting or stopping or turning curves, while at the same time they coact with the guide-posts $H^3$ and their sleeves to hold the bolster-plates at all times on a line about parallel with a line drawn transverse to the axis of the axles C C in direction of the length of the truck.

It will be observed that the truck-frame is itself elastically supported from the axles C C by the load-bearing springs C' C', interposed between the said frames and axles, and that the car-body on the bolster-plates is elastically supported from the truck-frame by the several springs F, G, and H, which are so located in the frame as to nicely distribute the weight of the car-body and its load about uniformly on each half-length of the truck-frame, while at the same time the compressed reacting springs I I and $C^2 C^2$ are unitedly contributing to preserve the bolster-plates and the car-body about parallel with the track-rails under all loads and on all grades and levels.

K K are X-form horizontal braces arranged one at each end of the truck and between the end portions of the side frames D D, Fig. 1, with which these braces are secured. These X-form braces comprise each bracing-bar members $k\ k$, Figs. 1 and 4, crossing each other at their middle and having their outer ends rigidly secured to the said side frames by means of tie-pieces $k'\ k'$ and rivets, as in Figs. 2 and 4. The union of the middle portions of these crossed bar members $k\ k$ are reinforced by means of the tie-plates K'(shown by full and dotted lines in Fig. 1) and are applied, preferably, to the lower sides of the said members $k\ k$ of these X-form braces and flanges $k^2 k^2$, bearing against the edges of said members, as shown in Fig. 1. Rivets $k^3$, hot-driven and riveted, hold the said bracing members $k\ k$ and this reinforcing middle plate K' rigidly secured together, while the end tie-pieces $k'\ k'$ and their rivets rigidly secure the outer ends of these horizontal X-form braces to said side frames D D, and their flanges $k^4 k^4$, Fig. 4, remove all liability of the rivets being affected by any shearing strain thereon. This flanged reinforcing-plate K' and the flanged end tie-pieces $k'\ k'$, secured as above described, rigidly hold the members $k\ k$ of each X-form brace K from shifting so as to change them in the least from their normal angles, while at the same time, being secured to the outer end portions of the side frames D of the truck, as described, they rigidly hold said side frames and prevent them shifting longitudinally in relation to each other. These two X-form braces K, being in place at each end of the truck and rigidly secured to the end portions of said side frames, outside the axles, are relatively so far outward beyond the span of the wheel-base of the truck that they are made to be more effective to resist the racking strain on the truck when turning short curves than are similar X-form braces secured, as heretofore, at the middle of the truck and its wheel-base.

At each end of each side frame D of the truck is arranged a jointed brace having one end thereof secured to a portion of each sill of the car-body at a point beyond the truck, while the opposite end thereof abuts against a fixed abutment-piece rigidly secured to the frame D at near its pedestal $d$, while the joint in this brace is between its said two ends and at such a distance from the fixed abutment-piece as to be at a point near the terminal end of the said frame D and adjoining the guiding-post $H^3$ or its equivalent piece. A description of one of these jointed braces and its coacting devices will be sufficient for a clear understanding of the same. This jointed brace comprises two bar-form members, which may be made of iron or steel and solid or in part tubular in form, and each member may be made to consist of a single piece produced by casting or forging, yet I at present prefer to make each said member to consist of the inclined bar L' and vertically-oscillating bar $L^2$ and the respective end adjuncts of each said members, as shown on enlarged scale in Figs. 3, 4, and 5.

M is a flanged socket-piece receiving the outer end of the inclined bar-form member L' and secured, by means of bolts through its flanges, to the sill of the car-body, as shown in Figs. 3 and 5.

L⁴ is an abutment-piece having integral with its forward end portion a socket which receives the lower and rear end of the inclined bar member L' and having its rear end face l' inclined downwardly and forwardly, as shown in Fig. 3, and having between its said inclined face and its socket portion a vertical perforation, which nicely receives the lower end of the guiding-post H³, and is secured thereon and against the lower end of the vertical movable spring-seat I' by means of a screw-nut, as shown in Fig. 3.

L³ is the fixed abutment-piece, which may have its body made with any suitable form to adapt it to be rigidly secured to the frame D. This fixed abutment is provided with the downwardly and forwardly inclined bearing-face l, which is substantially at the same angle of inclination as the inclined bearing-face l' of abutment L⁴, so that said inclined faces l l' will be substantially parallel. I prefer to form the abutment L³ integral with the body of the lower sleeve J² of the guide-post J, as shown in Fig. 3, so that rivets r² may hold said abutment rigidly fixed in place in frame D. This vertically-oscillating bar member L² has its opposite ends provided with rocker-form bearing-faces made each on a true curve, (indicated by dotted lines in Fig. 3,) which are in both cases drawn from centers respectively located at the middle of the opposite end rocking face and at points thereon at which the axial line of said bar member intersects it. By reason of these bearing-faces being made each on a true curve and from a radius equal to the length of the said bar member L² from one said curved face to the other the oscillations of this bar member when the car is in service are substantially dual in character and are each from a progressively-changing point of contact on each of the parallel inclined faces l l' of the respective abutments L³ L⁴, and the said bar member is thereby prevented from bodily traveling vertically, while at the same time the employment of a pair of toothed racks and gear-teeth for imparting a rotary movement about a central axial point as heretofore employed with vertically-traveling rollers are wholly obviated, while at the same time this oscillating bar member L² is made to be unchanging in its length between its points of contact with the parallel inclined bearing-faces of its contiguous abutments and is adapted to operate as a sure and equal support between the truck-frame and the bar member L' to prevent the latter from yielding in direction of its length and downwardly and rearwardly under the load from the car-body which may be imposed on it. Another advantageous result attending the use of the above-described oscillating bar member L², as constructed and employed in this jointed brace and with the described coacting elements, is that when the car is in service said bar member L² does not impart a horizontal reciprocating motion to the lower end of the post, which connects and supports the lower and rear end of the inclined bar member L' with the sill of the car-body, as does a pitman form of brace when pivoted by one of its ends to the truck-frame and by its opposite end to a vertical post, as guide-post H³, or to the rear end of an inclined brace, as bar member L', while another advantageous result had is that wear from friction of any of the coacting parts employed with this jointed brace between the piece M and the truck-frame is wholly prevented. Another advantage attending the use in this jointed brace of this oscillating bar member L², having rocker-form end bearing-faces working in contact with the pair of parallel inclined faces of the two opposite end abutments L³ L⁴, is that the said oscillating bar member L² may be made with its length increased from less than one-quarter to double of the relative length shown, or more or less, as the length of the car-body past the outer ends of the truck may be increased or loads on the outer ends may require, and that, as is apparent, it is not necessary in all cases to use for a king-post a post passing from the sill of the car-body down and through sleeves secured in the truck, as post H³, as a suitable post may be rigidly secured to the sill at any suitable point forward of the outer end of the truck and to the lower and rear end of the inclined bar member for supporting the same at one given angle or inclination without departing from the invention.

The above-described elements and coacting parts constitute improvements which are of great mechanical value in motor-trucks for contributing to the strength of its several parts and producing a truck-frame of such great rigidity and stiffness at the joints of its several connected parts as to adapt the frame to endure all the kinds of strains incidental to motor-trucks and preserve all parts of the same in their original or normal condition without liability of changing under the many forces and strains generally affecting motor-trucks as heretofore constructed when in service.

Housing N in each pedestal is provided on their outer ends with vertical ways n, and their side walls n are opposite webs n² n² of the jaws of the pedestal. Piece O is interposed between the respective lower ends of the jaws of the pedestal d and is secured to them by means of bolts o o, Fig. 3, and serve as a device for retaining the said jaws at all times in service in their normal condition, and also serve as a seat for the reacting spring C² between it and the lower side of the housing.

Having described my invention, what I claim, and desire to secure by Letters Patent, is—

1. In a motor-truck, a side frame formed by the combination with two duplicate frames D' D², comprising each the two bar members b b rigidly secured together at a point midway in the length of said frames and having their outer end portions c extended horizontally forward, and the bar members $b'$ $b'$ at an angle to the outer end portions of bar members $b$ $b$ and having each an extended horizontal end portion c arranged parallel with portion c of bars $b$ with the lower edge of the latter bearing against the upper edge of the former, of pedestals $d$ $d$ rigidly secured by their outer and inner side flanges to the respective bar members of said duplicate frames, spring seating-blocks serving as ties between the horizontal end portions c c of the said bar members of said frames, and spring-blocks G' serving as tie-pieces between the inclined portions of the bar members $b$ $b'$ which are between portions c c and the pedestals, substantially as and for the purposes set forth.

2. In a car-truck, the combination with the bar members $b$ $b'$ of the two duplicate side frames $D'$ $D^2$ having their respective end portions c c horizontal and parallel, with an edge of each said end portions bearing against an edge of the other, of a block and rivets rigidly securing together the said end portions of the respective bar members, of each duplicate frame, and those of each duplicate frame with those of the other, substantially as and for the purposes set forth.

3. In a side frame of a motor-truck, the combination with two pedestals and two duplicate frames having in each outer end portion of each said frames bracing bar members $b'$ $b'$ secured to the lower and forward side flanges of said pedestals and having their forward end portions c extended horizontally and with their upper edges bearing against the lower edges of the outer end portions c of the bar members of said duplicate frames, of spring seating-block and rivets holding said outer end portions c c of the said two bar members together, edge to edge in each duplicate frame and also holding the outer ends of each duplicate frame rigidly secured to those of the other, substantially as and for the purposes set forth.

4. In a side frame of a motor-truck, the combination with two pedestals and two duplicate frames comprising each similar bar members $b$ $b'$ rigidly secured respectively to the outer and inner side flanges of the said pedestals and arranged in such relation to each other that the bar members $b'$ may brace the forward portions of the bar members $b$ and have their horizontal outer end portions c bear against the lower edge of the outer end portions of the respective bar members $b$, of spring seating-blocks and rivets rigidly securing together the outer ends of the respective bar members of both duplicate frames, and blocks between said pedestals and spring seating-blocks and arranged and secured by means of rivets between the respective bar members $b$ and $b'$ of the duplicate frames, whereby the respective bracing bar members may be rigidly secured to the respective bar members above them, in said duplicate frames, and rigidly secure each duplicate frame with the other at points, in the side frame, between said pedestals and outer end spring seating-blocks, substantially as and for the purposes set forth.

5. In a motor-truck, the combination with the dual side frame D comprising duplicate frames $D'$ $D^2$, formed each by the combination with pedestals $d$ $d$ of bar members $b$ $b$ and $b'$ $b'$, which have their horizontal end portions c c parallel in each duplicate frame and also the dual side frame, and have said horizontal portions in each duplicate frame edge against edge, of blocks secured by rivets and serving as ties rigidly holding the assembled said horizontal parallel end portions together, and spring-seats arranged and rigidly secured by rivets between the said two bar members $b$ $b'$ of said duplicate frames at points between the respective pedestals and tie-serving blocks, substantially as and for the purposes set forth.

6. In a motor-truck, in each end portion of each side frame thereof from the respective pedestals outward, the combination with a pedestal of two parallel longitudinal bar members $b$ $b$ secured each to the upper inner and outer flanges of said pedestal, two parallel inclined bar members $b'$ $b'$ having their outer end portions C extended horizontal and parallel with the extended end portions c of bar members $b$ $b$, with their edges bearing against edges of the latter, and having their rearward ends rigidly secured to outer and inner flanges integral with the lower end of the pedestal, of a spring seating-block rigidly secured between the assembled pairs of parallel end portions c c of said bar members $b$ $b'$, a spring-block having a body which is rigidly secured, by means of rivets, to and between the parallel pair of inclined bar members and to and between the parallel longitudinal bar members $b$ $b$, and two guiding-sleeves which are secured each in alinement with each other, with one between each pair of bar members $b$ $b$ and the other between the inclined bar members $b'$ $b'$, the said spring-blocks being adapted to support, one, an elliptic spring and the other a spiral spring between said end portion of the truck-frame and a bolster-plate above, and the said sleeves being adapted to jointly receive and hold with a vertically-extended guiding-post secured to the said bolster-plate, substantially as and for the purposes set forth.

7. In a motor-truck, in each end portion thereof outward from the respective pedestals, the combination with a pedestal, bar members $b$ secured to the upper end flanges of the pedestal, inclined bar members $b'$ secured by their lower ends to the lower end of the pedestal and bracing the bar members $b$, a block rigidly secured to the outer ends of the said bar members $b$ and those of the inclined bracing bar members $b'$ and adapted to serve as a vertical sleeve, of a jointed brace, comprising an oscillating bar member and an inclined bar member which has its forward end secured to the sill of a car-body at a point forward of the truck, a vertically-moving post serving as a king-post and working in said vertical sleeve and secured to a plate adapted to be secured to the car-body and having its lower end secured to the lower end of said inclined bar member of the jointed brace, a fixed forwardly and downwardly incline faced abutment $L^3$ rigidly secured between the inclined bracing bar members of the end portion of the truck, and a forwardly and downwardly incline faced abutment $L^4$ secured to the lower end of the said inclined bar member of the jointed brace; the said oscillating bar member of said brace having its respective ends provided with rocker-form faces which bear, respectively against the said inclined faced abutments $L^3 L^4$, substantially as and for the purposes set forth.

8. In a motor-truck, the combination with the portion of the truck-frame forward of the pedestal $d$, a sleeve rigidly secured to the outer end of said forward frame portion and the forwardly and downwardly incline faced abutment $L^3$ which is rigidly secured to said forward frame portion at a point near the lower end of said pedestal, of a vertically-movable post secured to a plate adapted to be secured to the sill of a car-body and freely working in said sleeve, a jointed brace comprising the inclined bar L, having its forward end secured to the sill of a car-body and its rearward end to the said post and having with its rear end a forwardly and downwardly incline faced abutment $L^4$, the oscillating bar $L^2$, having its opposite ends provided with rocker-form faces which abut against the inclined faces of the said abutments, substantially as and for the purposes set forth.

9. In a motor-truck, the combination with an inclined bracing-bar which has its forward end adapted to be secured to a sill of a car-body and is provided at its rear end with the downwardly and forwardly inclined bearing-face $l'$, of a vertical post which is fixed from moving in relation to inclined bracing-bar and sill of a car-body to which said post may be secured, yet movable in relation to the truck-frame, the oscillating bar $L^2$ having its opposite ends provided with similar rocker-form faces, and piece $L^3$ rigidly secured to the frame of the truck, at a point near the lower end of the pedestal in the frame, and provided with the downwardly and forwardly inclined bearing-face $l$, substantially as and for the purposes set forth.

10. In a motor-truck, the combination with the bar members of the truck-frame, a spring seating-piece which is rigidly secured to said bar members, and holding with their assembled outer ends and having in its body below the seat thereof a spring-receiving chamber $i$, a load-bearing spring seated on said spring seating-piece for support of the sill of a car-body, a reacting spring I, wholly contained within said spring-receiving chamber, and the vertical movable spring seating-piece I', of the reacting spring I, of diameter corresponding with that of said chamber and also wholly contained within the same, of the upper spring seating-piece $H^2$, vertical post $H^3$ secured by its upper end to said upper seating-piece and supporting the said vertically-movable spring-seating piece within the said spring-receiving chamber and against the compressed reacting spring therein, an inclined bracing-bar having its forward and upper end adapted to be secured to the sill of a car-body and having its lower end secured to said vertical post, and a vertical oscillating bracing-bar interposed between the rear end of said inclined bracing-bar and the truck-frame, substantially as and for the purposes set forth.

11. In a motor-truck and arranged as a tie-piece between two parallel bar members of the truck-frame, a block having in it a vertical perforation for passage of a vertical moving post and also having with its forward side of body a bearing-face adapted to abut against a vertical oscillating bracing-bar, substantially as and for the purposes set forth.

12. In a motor-truck, the combination with the two side frames of the truck, of a horizontal X-form brace formed by the combination of the two bars $k\,k$, crossing each other at their middle, the reinforcing tie-plate K', rivets $k^3$ rigidly securing the said reinforcing tie-plate to the crossed bars at their crossing portions, and tie-pieces $k'\,k$ rigidly secured by means of rivets to the said side frames of the truck, substantially as and for the purposes set forth.

13. In a motor-truck, the combination with the two side frames of the truck in which two pedestals are secured to bar members of each side frame for receiving the journal-housings of the wheel-axles, of two horizontal X-form bracing mechanisms, comprising, each, two bars crossing each other at their middle, a reinforcing tie-piece K' provided with flanges $k^2\,k^2$ and secured to the crossing portions of said bars by means of rivets and the flanged tie-pieces $k'$ which are respectively rigidly secured, by means of rivets, to the outer ends of said crossed bars and to the portions of both the said side frames which are extended forwardly from said pedestals, substantially as and for the purposes set forth.

HORACE L. GEE.

Witnesses:
WM. H. TEN BROECK,
WM. C. PRESTON.